United States Patent [19]

Azcua et al.

[11] 4,441,160

[45] Apr. 3, 1984

[54] POINT OF SALE TERMINAL HAVING PROMPTING DISPLAY

[75] Inventors: Noris S. Azcua, Huntington Beach; George D. Margolin, Newport Beach; Audrey Miller, Claremont, all of Calif.

[73] Assignee: Auto-Register, Inc., Placentia, Calif.

[21] Appl. No.: 242,054

[22] Filed: Mar. 9, 1981

Related U.S. Application Data

[63] Continuation of Ser. No. 957,912, Nov. 6, 1978, abandoned.

[51] Int. Cl.³ .............................................. G06F 15/21
[52] U.S. Cl. .................................... 364/900; 364/405
[58] Field of Search ... 364/200 MS File, 900 MS File, 364/405, 404; 235/7 R, 12, 91 L, 378, 383; 340/365 R, 365 VL, 825.37, 825.54

[56] References Cited

U.S. PATENT DOCUMENTS

| Re. 26,919 | 6/1970 | Hagelbarger | 364/900 |
|---|---|---|---|
| 3,200,375 | 8/1965 | Lutz | 340/825.37 |
| 3,330,947 | 7/1967 | Alpert | 364/405 |
| 3,946,220 | 3/1976 | Brobeck | 364/200 |

*Primary Examiner*—David H. Malzahn
*Attorney, Agent, or Firm*—David S. Woronoff

[57] ABSTRACT

A point of sale terminal includes a computer, a keyboard, and a key-controlled prompting display for eliminating a need for the attendant to memorize sales information. The keyboard has a set of first item keys each of which corresponds to a different first item. The prompting display lists a large number of second items. The keyboard includes a set of category-representing keys each of which corresponds to a different category of second items available for sale. A selected category of items is displayed when the attendant actuates a category key. The display shows prompting indicia associated with each item. The keyboard includes a set of keys having indicia associated with the indicia displayed by the prompting display.

33 Claims, 10 Drawing Figures

POINT OF SALE TERMINAL HAVING PROMPTING DISPLAY

CROSS REFERENCE TO RELATED APPLICATIONS

This is a continuation of application Ser. No. 957,912, filed Nov. 6, 1978 now abandoned.

The present invention is related to two other patents for which applications were filed on the same date as the present application; all of which are assigned to a common assignee. These patents are Point of Sale Terminal Having Prompting Display and Automatic Money Handling, U.S. Pat. No. 4,310,885, invented by Noris S. Azcua, George D. Margolin, Audrey Miller and Victor V. Vurpillat and Automatic Money Handling Device, U.S. Pat. No. 4,249,552, invented by George D. Margolin and Victor V. Vurpillat. These two patents are incorporated by reference into the present application as fully as if they were reproduced herein.

SUMMARY OF THE INVENTION

The present invention relates to a point of sale terminal having a prompting device for prompting an essentially untrained operator to correctly use the terminal. The prompting mechanism itself can take one of three embodiments (among others). It can be a roll of graphics material, a cathode ray tube or a film display.

One embodiment of the present invention utilizes a keyboard which has a keyboard having item identifying keys, category keys, function keys and a number pad. The prompting display shows categories as keyed by the category keys. Each category has a list of items for sale at the terminal with a display showing the remaining codes which must be used by the operator to effect the sale of the selected item at the terminal. One embodiment of the present invention has one or more categories showing the same items depicted on the item identifying keys. This redundancy feature aids the operator who forgets what items are shown by the item identifying keys.

One embodiment of the prompting display has a window in the keyboard through which the display can be viewed by the operator. The display itself is formed from a strip of graphics material mounted on two rolls. The rolls are suspended in the housing for the terminal and driven by controllable electric motors. Marks are placed on the roll indicating the position of the categories. Sensors disposed in the housing detect the marks and in cooperation with a control device place the correct category before the display window.

In one embodiment of the present invention in which the prompting display is used in combination with a computer the category key and the keys actuated as instructed for a listed items are sufficient input to the computer to enable the terminal to process a sale at the terminal.

One embodiment of prompting display includes a movable roll having listings of items separated into a number of categories. A selected portion of the roll is moved to a viewing station for viewing a selected category. The roll is wound on a pair of spaced apart rollers on opposite sides of the viewing station. A bi-directional drive servo operates roll drive motors to display the selected category information at the viewing station. Indexing marks on the roll associated with category location information are detected during travel and fed back to a drive servo for controlling it.

According to one aspect of the invention a point of sale terminal has one or more computers which have input/output devices. In a preferred embodiment, the inventive device has at least one programmable microprocessor, a read-only memory storing programs, constants and the like, and a random access memory. In a preferred embodiment, a keyboard has item keys which an attendant can actuate to cause item-identification data to be entered into the computer.

The prompting display shows items for sale arranged by category with all necessary coding information to enable an operator to actuate the keyboard and complete the sale of a particular item. A number of category keys are placed on the keyboard which correspond to the categories shown by the display. A computer receives item identification data, retrieves from the memory price data for each keyed item, and calculates the total price of the transaction.

DETAILED DESCRIPTION

Keyboard

Figure 1:
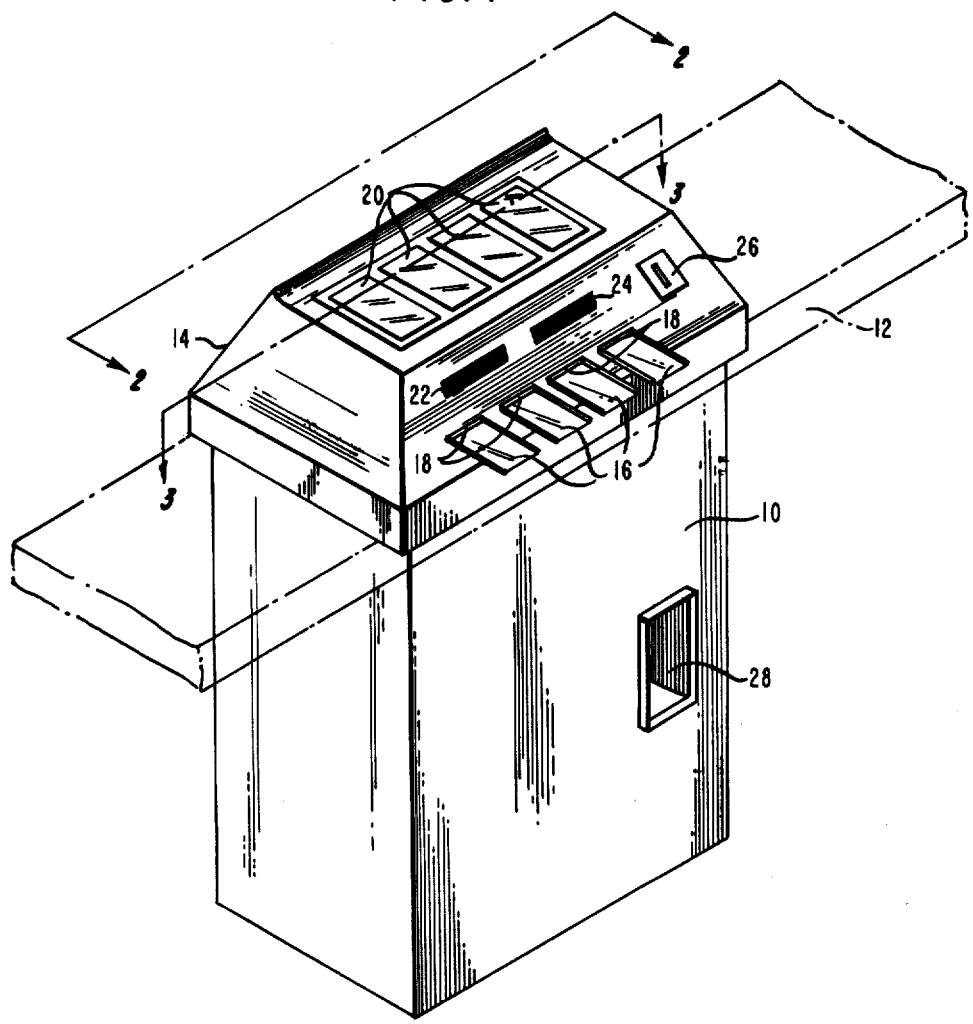
FIG 1 shows a top perspective view of the housing forming a part of one embodiment of the invention.
Figure 2:
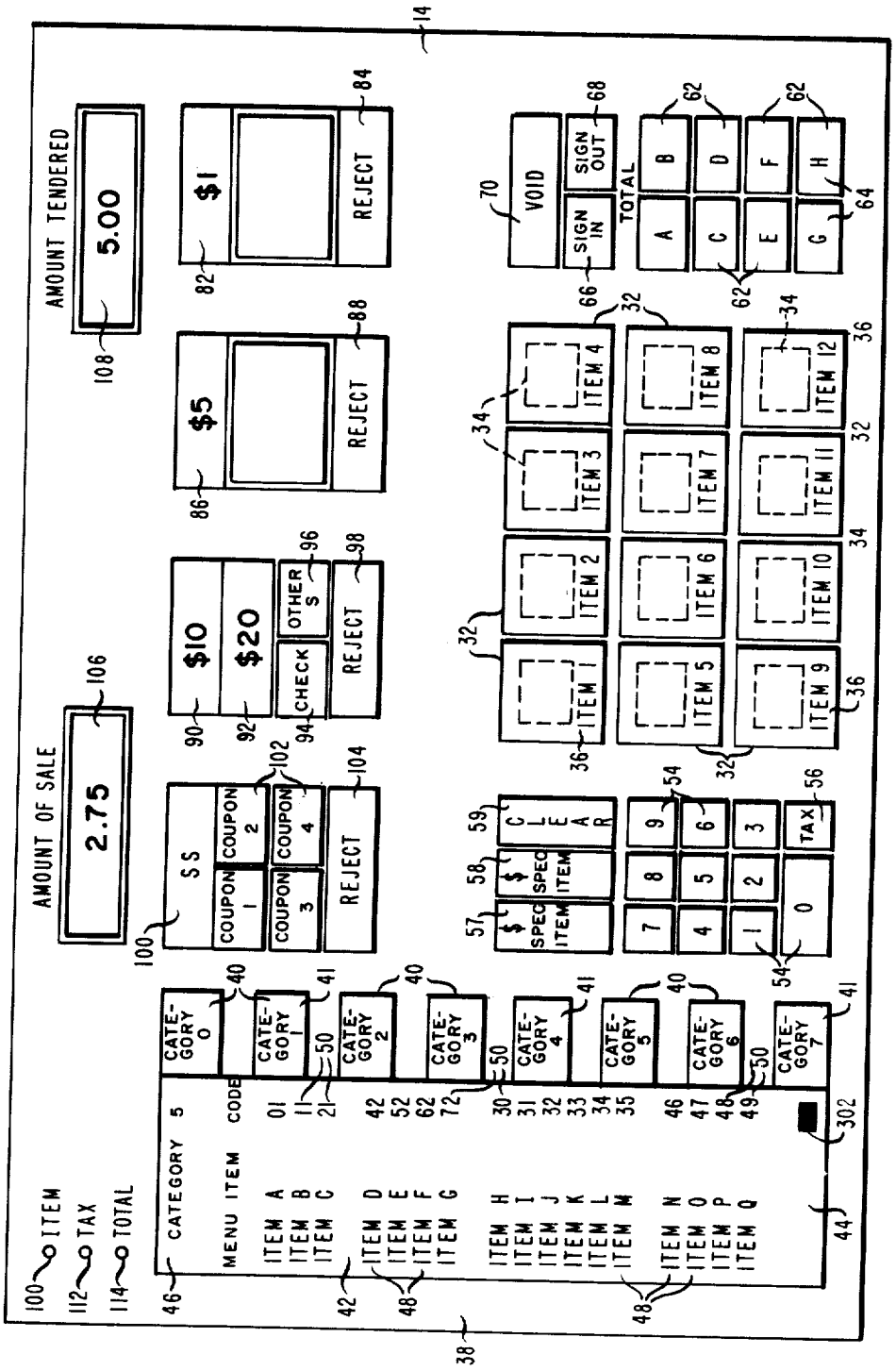
FIG. 2 shows a view of the housing taken along the line 2—2 shown in FIG. 1.
Figure 3:
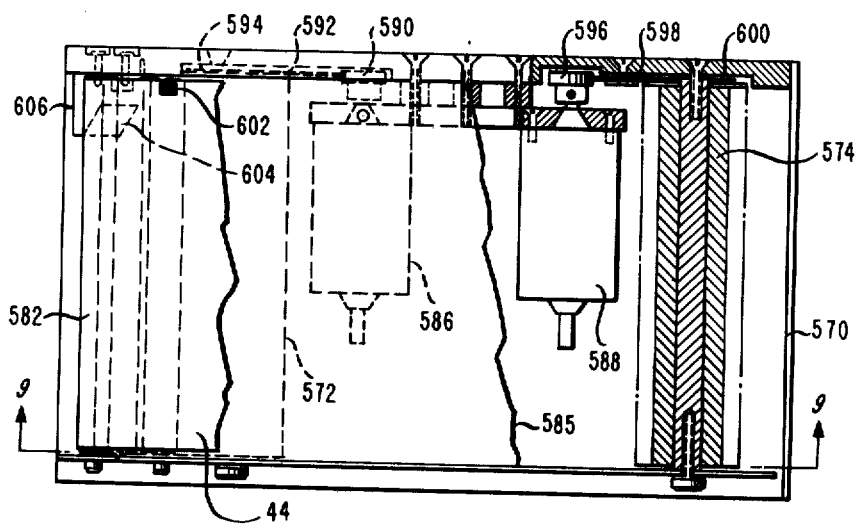
FIGS. 3 and 4 show two views of one embodiment of a part of the present invention.

The keyboard illustrated in FIG. 2 includes a group of individual item-representing keys 32, or Best Seller keys. In the illustrated embodiment there are twelve Best Seller keys 32 in the group. Each Best Seller key preferably has a corresponding pictorial representation, (illustrated in phantom lines at 34 on each key) of the item associated with that particular key, together with a separate label 36 printed on each key describing the item associated with that particular key. The labels 36 relating to the items identified by the twelve Best Seller keys are indicated in the drawings as Item 1 through Item 12 for simplicity.

The keyboard 14 also includes a prompting display 38 for displaying product category and corresponding item-listing information for the less frequently sold items and for the Best Seller items the prompting display provides data for prompting the attendant to actuate certain keys on the keyboard to identify to the data processor corresponding less frequently sold items being sold at the point of sale.

In the illustrated embodiment, a series of eight mutually spaced apart Category keys 40 are positioned alongside a window 42 which covers the prompting display and through which the prompting display can be viewed. Each category key has a corresponding label 41 for identifying a category of information to which the key corresponds. The prompting display includes a movable roll 44. An electro-mechanical drive apparatus is provided for moving the roll 44. Each category and its related list of items is printed on the roll. A selected portion of the roll can be moved to the window 42 for display when the attendant actuates a particular Category key 40. For example, in the embodiment shown a category heading 46 entitled "CATEGORY 5" displays a listing of corresponding individual items 48, depicted as "ITEM Q"; and when the attendant manually actuates the category key 40 labeled "CATEGORY 5" the roll 44 is moved until the listing for CATEGORY 5 is displayed in the window 42.

The roll shows a separate item-identifying code 50 unique to each item listed in the prompting display. In the illustrated embodiment the prompting indicia for each item is a two-digit number displayed on the roll next to the item.

A group of numeric keys 54, hereafter collectively called a numeric pad, are positioned on the keyboard next to the prompting display 38. The numeric pad preferably comprises ten individual keys labeled 0 through 9, respectively, with an eleventh key 56 labeled "TAX", for identifying taxable items. The numeric pad can be used to identify to the data processor items selected from the prompting display. To identify each item selected from the prompting display, first a category key is actuated and then two of the numeric keys are actuated in an order which supplies to the data processor a three-digit number for identifying the selected item. For example, to indicate ITEM J in CATEGORY 5 first the CATEGORY 5 key is actuated and then the numeric keys are actuated in the sequence 3,2 for supplying a corresponding three-digit number(5,3,2) to the data processor for identifying ITEM J.

The prompting display roll preferably contains a listing of all available items for sale. Owing to this preferred feature, "redundancy" is provided in that items represented on the Best Seller keys 32 are also represented on the roll.

By way of example, in the course of the orderentry phase of a sales transaction involving the sale of one or more best seller items and one or more less frequently sold items, separate item-representing keys 31 are actuated to indicate purchase of each best seller item. The prompting display is actuated to display information relating to each item not represented on the Best Seller keys, and in a sequence prompted by the prompting display, the numeric keys 54 are actuated to indicate a separate multi-digit code for each less frequently sold item displayed on the prompting display. Data processor subsystem includes a look-up table for retrieving a pre-loaded price for each item identified in the order-entry phase of the sales transaction. The Tax button 56 is actuated after each taxable item is indicated and the data processing subsystem calculates the tax on each taxable item. An arithmetic unit in the data processor sums the individual prices of each identified item, as well as the tax on each item, so as to calculate the total price of the sale transaction.

Prompting Display

Figure 4:
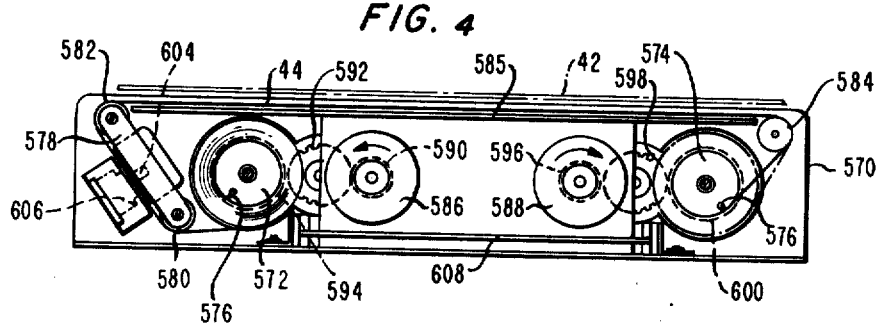
Figure 5:
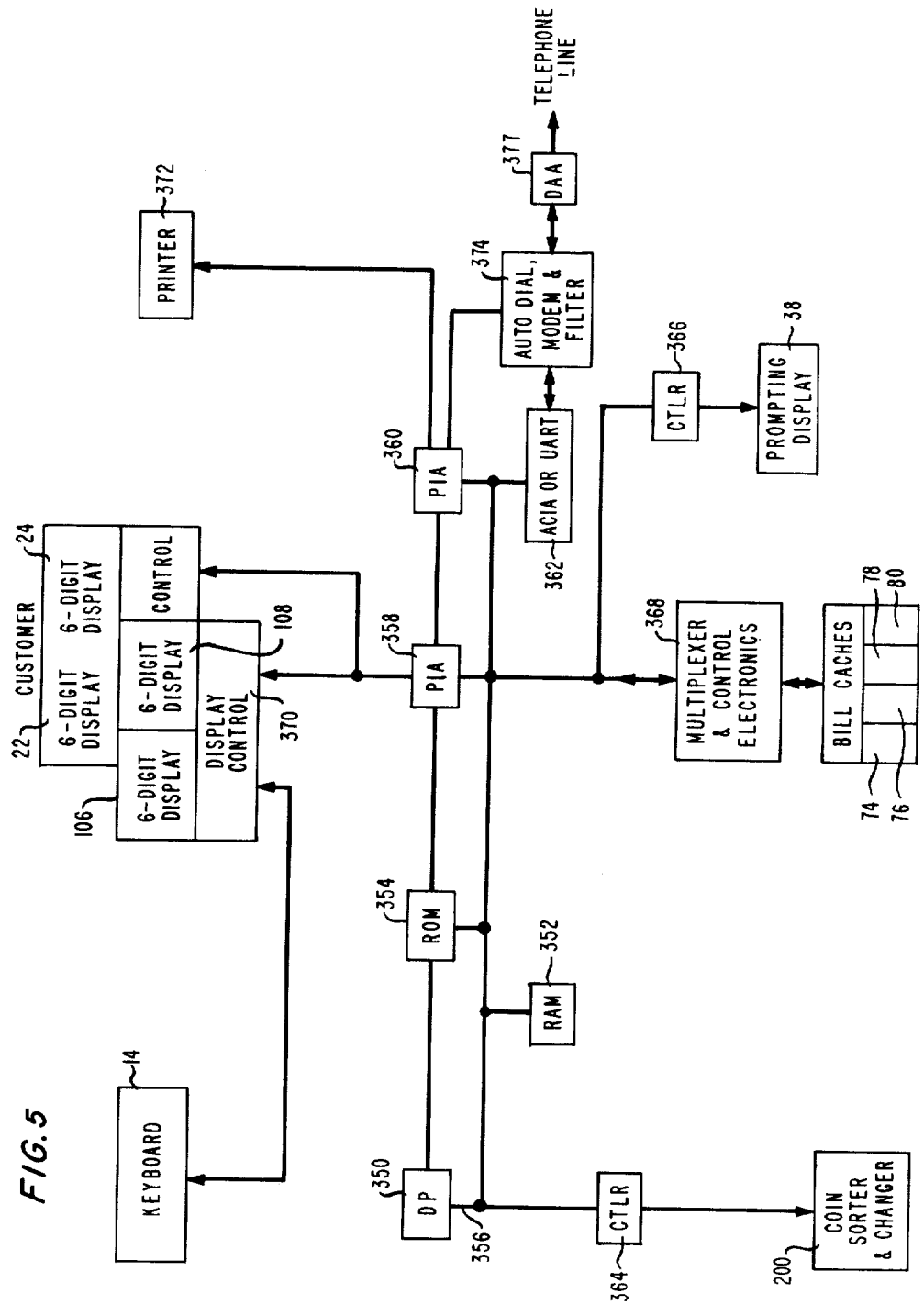
FIG. 5 shows a block diagram showing an embodiment of the present invention as part of a larger point of sale terminal system.
Figure 6:
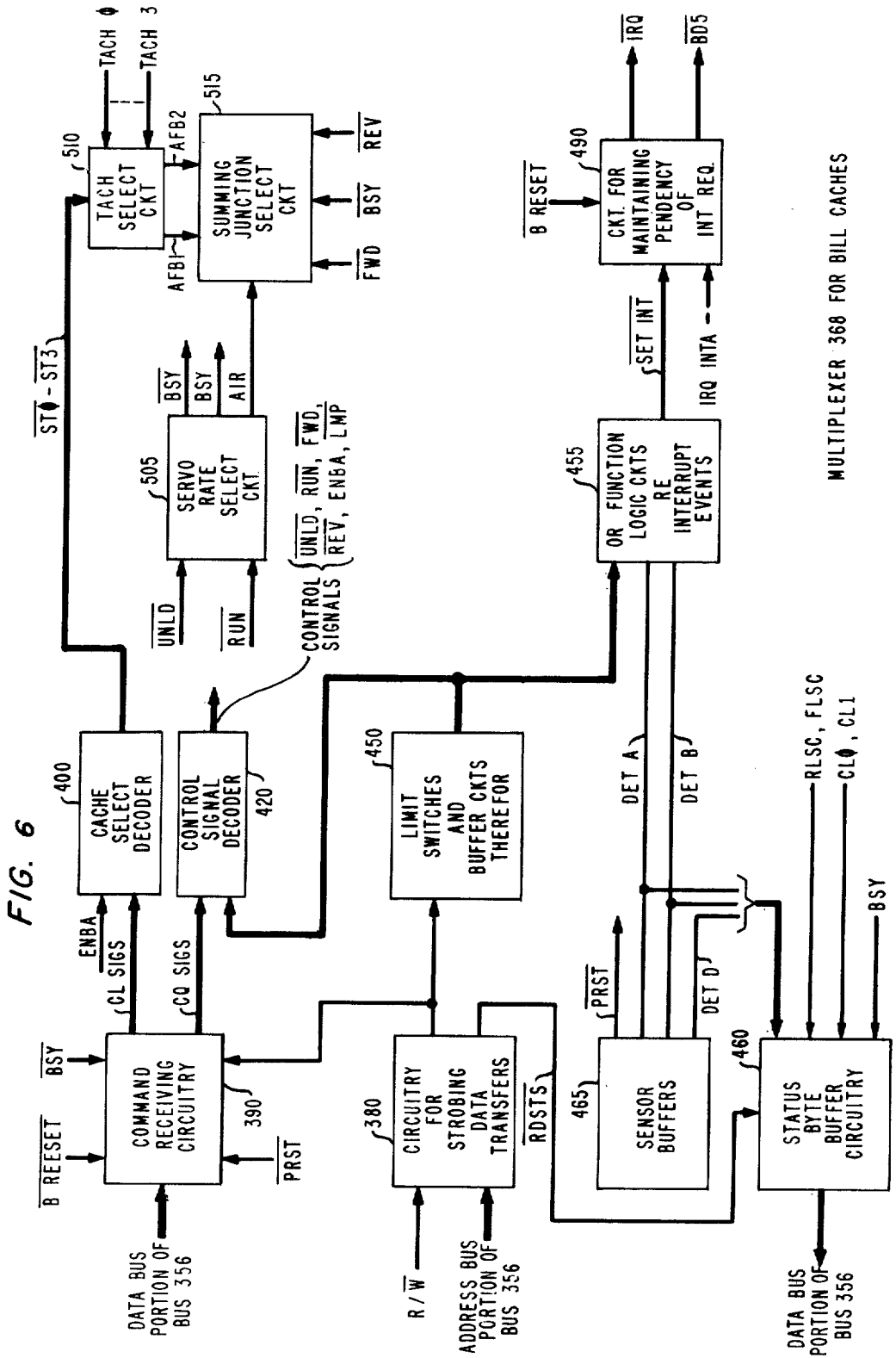
FIG. 6 shows a block diagram of the multiplexer shown in FIG. 5.

The construction of one embodiment of the prompting display 38 is understood best by referring to FIGS. 4 and 5. The prompting display is contained in a housing 570 shaped generally as an elongated rectangular box having a hollow interior. The prompting display housing is mounted inside the point of sale housing 10 below the window 42 in the keyboard 14. The prompting display housing has an open top, and the portion of the roll 44 which is displayed below the window in the keyboard extends from one end of the prompting display housing to the other end across the top of the housing to the other end of the housing.

The prompting display housing contains first and second rollers 572 and 574 mounted near opposite ends of the housing 570 on bearing members. Each roller has a radial slot 576 for releasably securing ends of the roll 44. A roll tensioner 578, located at one end of the housing adjacent the first roller, has roller 580 and 582 and a guide roller 584.

The upper edges of the tensioner upper roller 582 and the guide roller 584 define a generally horizontal plane of travel, or viewing path, of the roll across the top of the housing. Information displayed on the viewing path of the scroll can be viewed through the window 42 in the keyboard. An elongated generally rectangular-shaped plate 585 covers the open top of the prompting display housing below the viewing path of the roll. The plate has opposite ends closely spaced upwardly from the upper roller 582 and the guide roller 584. The plate 585, closely spaced below the viewing path, holds the roll level and protects the roll from contact with other parts of the prompting display. The tensioner 578 is adjustable.

The first and second rollers 572, 574 are powered by drive motors 586, 588 with gears 590, 592, 594, 596, 588, 600 to drive the roll in either direction.

The length of the entire roll 44 is greater than the length of the viewing portion. As previously described, separate categories of items for sale can be displayed along the length of the roll. For each category a listing of separate items are placed on the roll, and a (numeric) code is associated with each item for use in identifying that item. Each category of item information can be considered a separate page of information, and the pages of information are displayed at separate areas spaced along the length of the roll as a graphic display. The roll is contained on a magazine which can be loaded into the prompting display housing in a manner similar to a player piano scroll.

Separate longitudinally spaced optically readable indexing marks 602 are placed on the roll between adjacent pages. Preferably, each indexing mark is printed on the roll near one edge of the scroll in a space between adjacent pages on the side of the roll having the printed information. The indexing marks are detected by an optical emmitter 604 and 606 located in the housing. The optical detectors are used to control position servo system for positioning the roll so that any selected page of information can be moved to and stopped in the viewing position for display. Logic and control electronics used in the servo system are physically contained on a printed circuit board 608 contained within the lower interior of the prompting display housing.

The roll is moved to the selected page by actuating a corresponding Category key 40 on the keyboard. This supplies data to a servo control within the prompter which provides for issuing a command to either the forward drive motor 586 or to the reverse drive motor 588 to move the scroll in the proper direction for displaying the desired page. The optical sensor 606 supplies data to a counter in the prompting display each time a separate page passes the sensor. The counter counts the required number of pages until the selected page reaches the viewing position, at which time a command is issued for stopping the drive motor. The computer memory can store data relating to the page present in the viewing position to issue the next command to the drive motor for driving the roll in the proper direction through the prompter servo.

Once the selected page has been reached, sale of the selected item or items on the page can be entered by the numeric keys 54 using the two-digit number associated with the selected items as shown in the graphic display. The combination of page number and item number (three digits) is sufficient data to record and process sale information. Actual prices are determined by means of look-up tables used by the computer. In the embodiment shown, the page number is one digit and the item number is two digits.

Figure 10:
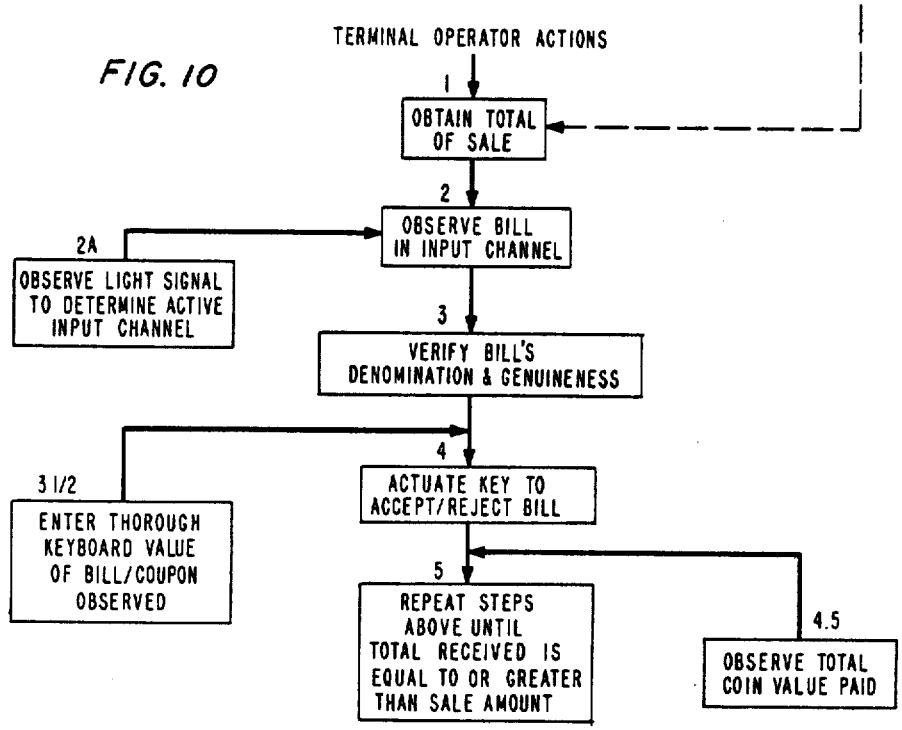

FIG. 10 shows in block diagram form the inventive method of use of one embodiment of the present terminal. Block 1 shows that the operator obtains from the terminal the total of a sale. The customer then inserts a bill into an input channel which causes a light signal to indicate which bill channel is in use. The money handler brings the bill to a viewing window. The operator observes the signal light and then looks to the proper viewing window to observe the bill that had been put into the device. After observation, the operator, as shown in block 4, actuates either an accept or a reject key. The above steps are repeated until the total cash received is equal to or greater than the amount of the sale. Blocks 3½ and 4.5 show the steps used by the operator if either a special bill or coupon is used or if coins are put into the device.

Figure 7:
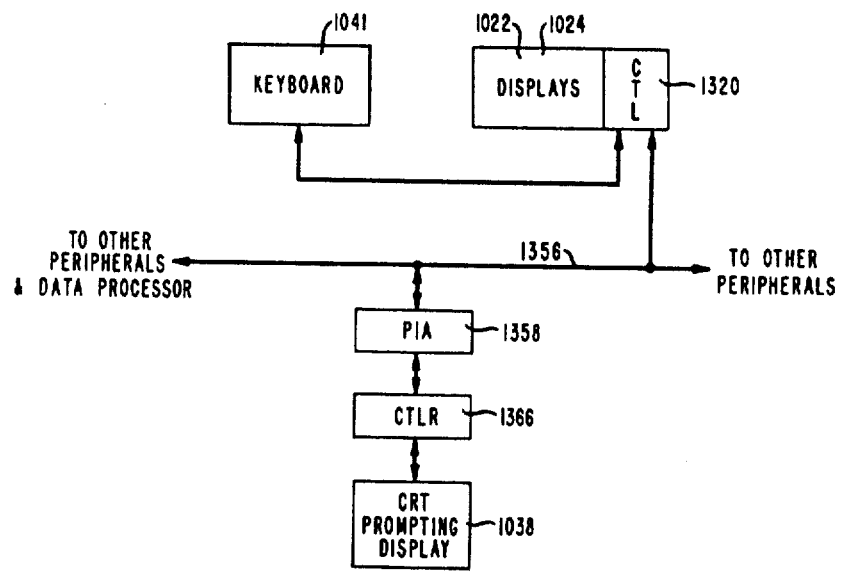
FIGS. 7 and 8 show two additional embodiments of prompting displays forming a part of the present invention.
Figure 8:
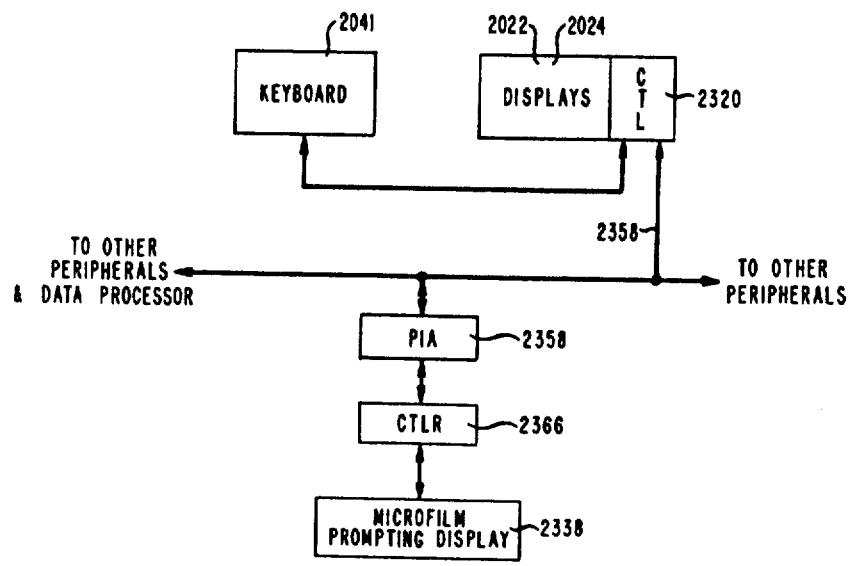

FIGS. 7 and 8 show two other embodiments of the present invention in which different forms of prompting display is used. In FIG. 7, elements which are similar to those shown in FIG. 5 have like numbers preceded by a "1" or a "10" to yield a four digit number. For example, keyboards 1014 and 14 in FIGS. 7 and 5 respectively are similar structurally and functionally. FIG. 8 shows that the display can be a CRT 1038 instead of the roll 38 shown in FIGS. 5 and 2. In such an embodiment, the data which must be stored to prompt the operator could be stored in the central processor or in a RAM or ROM or any other convenient storage device.

Figure 9:
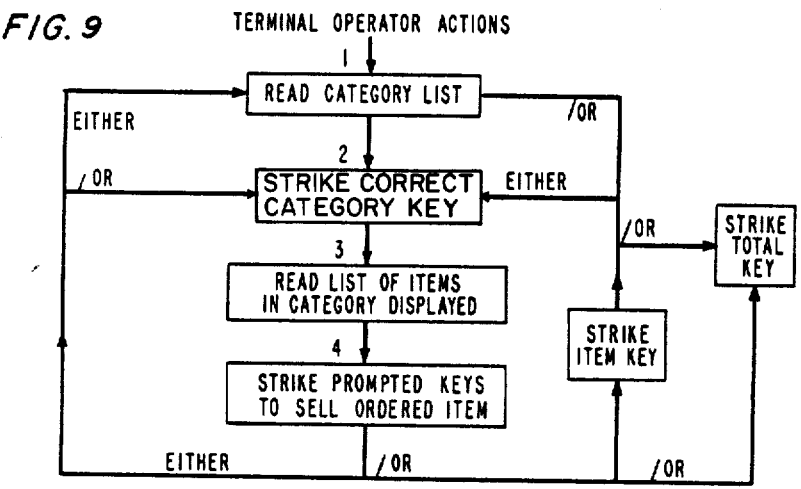
FIGS. 9 and 10 show the steps used by an operator when using the present invention.

FIG. 9 shows in block diagram form the novel steps which an operator takes in using the prompting device which forms a part of the present invention. When a customer orders an item, the operator either finds the item on the best seller keys or as shown in block 1 of FIG. 9, reads the category list or, as shown in block 2, selects and strikes the correct category key. Next, as shown in block 3, the operator reads the list of category items displayed. Then, as shown in block 4, the operator strikes the prompted keys to sell ordered item. The FIG. 9 drawing shows that the operator would then go back through the sequence for the next ordered item or strike an item key or strike a total key.

Accordingly, the inventors recognize that those skilled in the art to which the present invention relates understand that there are many variations possible in the structures shown and described in this application. These structures are shown as illustrations only and not in limitations of the inventive concepts described herein.

We claim:

1. In a point of sale device for ordering a number of items having a computer electronically interconnected to a keyboard, a memory device and a display device such that actuation of said keyboard causes the retrieval from memory of stored information and the display of the information on the display device comprising:

key members organized into a first and second hierarchy; said first hierarchy known as item keys wherein each key is uniquely identified with a single unit; said second hierarchy known as category keys wherein each key is uniquely identified with a group of single units;

each of said item keys depicting a single unit for being ordered;

each of said category keys depicting a group of single units which can be individually ordered;

the item ordered by the actuation of an item key is constant with respect to the actuation of a category key;

the keyboard containing enough category key members to display substantially all of the units which can be ordered at the device;

actuation of an item key member causes said point of sale device to order a unit;

actuation of a category key member causes said display to show a group of units for sale and the code necessary to order any unit in the group displayed.

2. The device claimed in claim 1 including further:
    key means for entering into said computer the code displayed upon actuation of a category key member.

3. The device claimed in claim 1 wherein said keyboard has function key members.

4. The device claimed in claim 3 including key means for entering into the computer the code displayed upon actuation of a category key member; the actuation of the category key member and code key means as prompted by said information recalls from memory the correct information to complete the ordering of an item.

5. The device claimed in claim 1 wherein said display means shows all units for sale arranged by category.

6. The device claimed in claim 1 wherein said display means shows the operator said units by category only.

7. The device claimed in claim 1 wherein said display means comprises:

a graphic display member having an outer and inner surface;

a suspension means;

a display window means;

a controllable moving means;

a housing means;

said suspension means contained in the housing means for holding said graphic display member opposite said window means;

said controllable moving means for changing the position of said graphic display member opposite said window means responsive to the actuation of said number item keys and said function category keys.

8. The device claimed in claim 7 wherein:
    said graphic display member is divided into a plurality of separate segments for positioning opposite said window means.

9. The device claimed in claim 7 wherein said graphic display means comprises a roll of printed material divided into separate categories with each category having one or more items listed thereon;

each category item showing the necessary key coding to enable the operator to properly effect a sale of an item.

10. The device claimed in claim 9 wherein:

said roll of printed material has a plurality of indicia thereon for separating said roll of printed material into a plurality of separate categories;

a sensing means is disposed in said housing means for detecting said plurality of indicia;

said sensing means is operatively connected to said controllable moving means for controlling the position of said roll by said sensed indicia.

11. The device claimed in claim 10 including further automatic positioning means operatively connected to said movable control means for returning said roll to a predetermined position after the actuation of a key means.

12. The device claimed in claim 10 wherein said item keys have a pictorial representation of the represented item.

13. The device claimed in claim 10 wherein said roll means includes a display of all items represented by said item keys.

14. The device claimed in claim 10 wherein said computer contains in memory all of the information necessary to effect a sale of any item when the key means are actuated to indicate the sale.

15. The device claimed in claim 10 wherein said keyboard includes a plurality of function key members wherein one of said function key members enables said category keys and said item keys.

16. The device claimed in claim 1 wherein said display means comprises an electronically actuated display member.

17. The device claimed in claim 1 wherein said display means comprises a cathode ray tube member.

18. The device claimed in claims 17 or 16 including further wherein said key members include number key members having a plurality of category key members forming a part of said number keys contained on the keyboard.

19. The device as claimed in claim 1 wherein said display means comprises an optical display member having the items for display stored on film.

20. The device claimed in claim 19 including further category key members contained on the keyboard.

21. The device claimed in claim 17 or 19 wherein said display has a first mode and a selected mode and said display means displays said first mode after the actuation of said number keys.

22. In a keyboard device for use with a point of sale device for ordering a number of items having a computer electronically interconnected to the keyboard, a memory device and a display device such that actuation of said keyboard causes the retrieval from memory of stored information and the display of the information on the display device comprising in combination:

key members organized into item keys and category keys, each of said item keys depicting a single unit for being ordered; each of said category keys depicting a group of single units which units can be individually ordered;

a housing means for said keyboard device;

actuation of an item key member causes said point of sale device to order a unit;

actuation of a category key member causes said display to show a group of units for sale and the code necessary to order any unit of the group displayed;

the items displayed by the actuation of a given category key are constant regardless of the actuation of any other key;

the items ordered by the actuation of an item key are constant with respect to the actuation of any other key;

key means for entering into said computer the information displayed upon actuation of a category key member;

the items ordered by the actuation of an item key are invariant with respect to the actuation of a category key.

23. The device claimed in claim 22 including further: a controllable moving means for actuating said display device in response to the actuation of said category key members.

24. The device claimed in claim 23 wherein the display device comprises a roll of graphic material supported on bearing members such that the graphic material can have motion relative to the bearing members; a viewing frame member; said graphic material moved by said controllable moving means to show individual categories through said viewing frame member.

25. The device claimed in claim 22 wherein said display device comprises a cathode ray tube member whose output is activated in response to the actuation of the keyboard having category keys.

26. The device claimed in claim 22 wherein said display device comprises an illuminating means and film member having portions of said film divided into categories which are illuminated in response to the actuation of the keyboard with the category keys.

27. The device claimed in claim 22 wherein the point of sale device keyboard has item keys for indicating the sale of a first group of most frequently ordered items and said display device categories include said first group of most frequently ordered items.

28. The device claimed in claim 27 wherein said items for sale are displayed together with the necessary information to instruct an operator of the point of sale device how to complete the sale of an item.

29. The device claimed in claim 28 including further:

said housing means has a viewing window formed therein;

a strip of printed material having a plurality of segments of physical size mated to the physical size of said viewing window;

said strip mounted on a rotary propelling means for imparting relative motion to the strip past the viewing window in response to the actuation of the keyboard.

30. The device claimed in claim 29 wherein the total number of items shown on the strip is larger that the number of items shown on said item keys.

31. The device claimed in claim 30 wherein said strip has a plurality of position indicating marks thereon; a sensing means is disposed within the housing means for detecting the position indicating marks on said strip and for generating a signal for enabling said rotary propelling means to control the position of said strip relative to said viewing window.

32. The device claimed in claim 28 wherein said keyboard of said point of sale device includes key members with indicia corresponding to the information displayed codes.

33. The device claimed in claim 28 including further key members mounted on said housing having indicia corresponding to the information displayed.

* * * * *